United States Patent Office 3,432,870
Patented Mar. 18, 1969

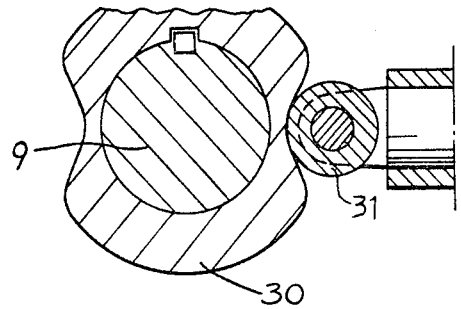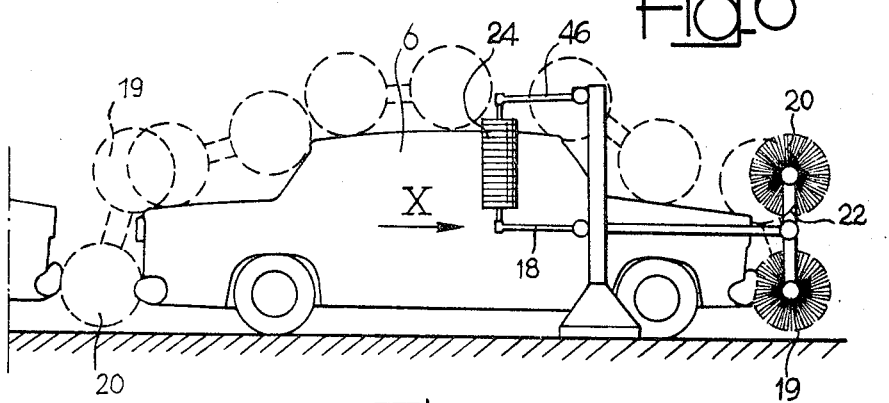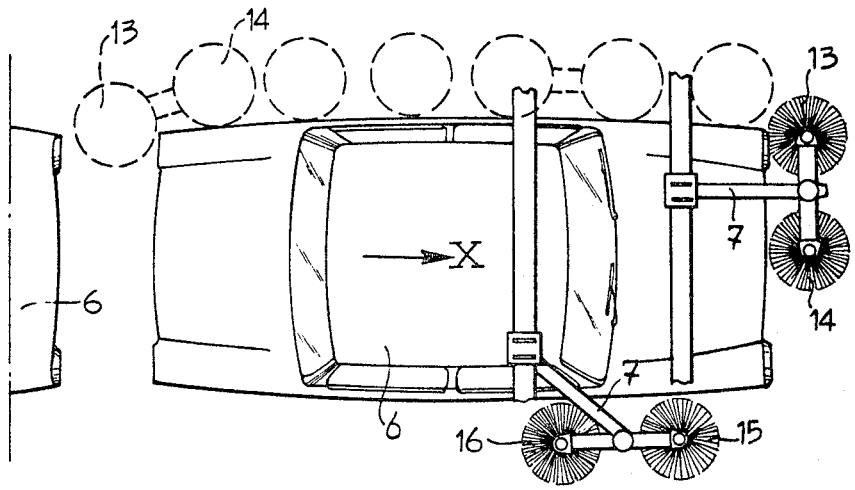

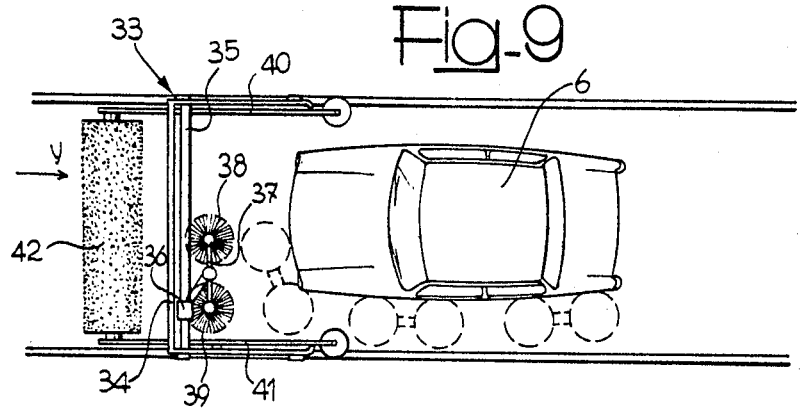
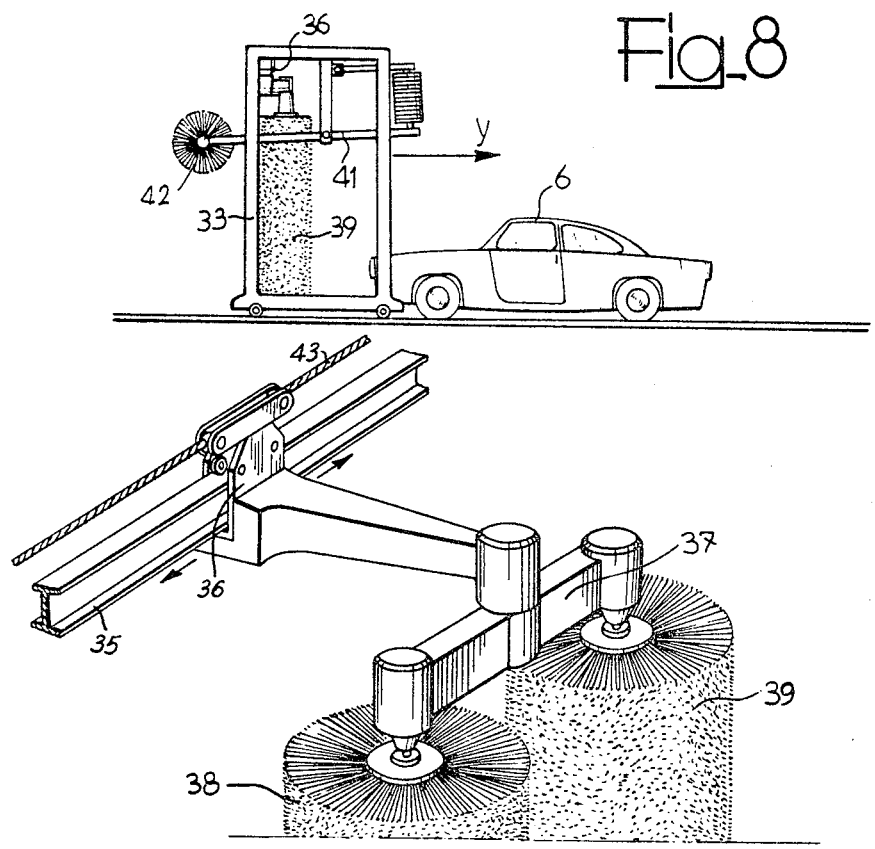

3,432,870
WASHING PLANT FOR VEHICLES
Giovanni Emanuel and Carlo Zucca, Moncalieri, Turin, Italy, assignors to Soc. Acc. Emanuel di G. e R. Emanuel & C., Turin, Italy
Filed May 1, 1967, Ser. No. 635,116
Claims priority, application Italy, May 6, 1966, 10,676/66
U.S. Cl. 15—21        5 Claims
Int. Cl. B60s 3/00; A46b 13/02

ABSTRACT OF THE DISCLOSURE

A car washing plant has both vertical and horizontal brushes with a particular resilient mounting for a pair of vertical brushes. The pair of vertical brushes are rotatably mounted on a horizontal beam, which beam is pivoted about a vertical axis and is resiliently urged towards the middle regions of the vehicle washing plant. More than one pair of brushes may be arranged in this particular manner with one pair disposed at one side of the vehicle and another pair at the other side of the vehicle.

---

The invention relates to a washing plant for vehicles, generally of the type comprising a plurality of rotary brushes carried by supports which are articulated to a frame and which urge the brushes against the sides and top of a vehicle as it is washed.

In some plants of this type the brush supports are mounted on a stationary frame, the vehicles being slowly moved therethrough or therepast on or by a conveyor. In other plants of this type the vehicles remain stationary while the frame is moved with respect to them. In all these plants the axes of the brushes which act on the sides of a vehicle are vertical and the axes of the brushes which act on the top of a vehicle are horizontal.

In practice, plants of this nature are objectionable in that the vertical and horizontal brushes do not function consistently and equally efficiently over the entire vehicle surface and thus leave a number of inadequately cleaned areas, particularly at those regions of the vehicle which are situated at or near the limits of the ranges of action of the brushes.

In known plants it is moreover difficult to clean both the front and rear faces of the vehicle inasmuch as the vehicle, in moving relatively to the frame, may escape the action of the vertical brushes in these regions.

With this latter drawback particularly in mind it has previously been proposed that further brushes be employed in addition to the existing brushes, which further brushes have a vertical axis and follow the vehicle during its movement relative to the frame.

An object of the present invention is to arrange for the existing brushes to function over the whole surface of the vehicle, including the vehicle rear, thus obviating the need to employ an arrangement for causing any brushes to following the movements of the vehicle.

A further object of the invention is to provide a plant wherein the brushes function at least substantially uniformly over the whole surface of the vehicle body.

According to these and other objects the invention consists in a washing plant for vehicles comprising a frame carrying a plurality of cylindrical brushes which are rotatable some about vertical and some about horizontal axes to act respectively on the sides and top of a vehicle body, and means being provided for effecting movement of the vehicle with respect to the frame or vice versa, the plant including at least one pair of brushes each with a vertical axis, the brushes of the each pair being rotatably supported one at or near each of the opposite ends of a horizontal beam, the beam is rotatable about a pivot point having a vertical axis, the beam pivot point being resiliently urged towards the middle regions of the plant frame. These and other objects and advantages of the invention will be clear from the following description, given with reference to the accompanying drawings which are by way of example and in which:

FIG. 5 is a sectional view taken along line V—V of FIG. 4;

FIGS. 6 and 7 are a diagrammatical side elevational and a plan view, respectively, showing the operation of the plant;

FIGS. 8 and 9 are a diagrammatical side elevational view and a plan view, respectively, of a modified plant according to the invention; and FIG. 10 is a perspective view of a detail of FIG. 9, the view showing the mode of suspension of the vertical brushes thereof.

Figure 1:
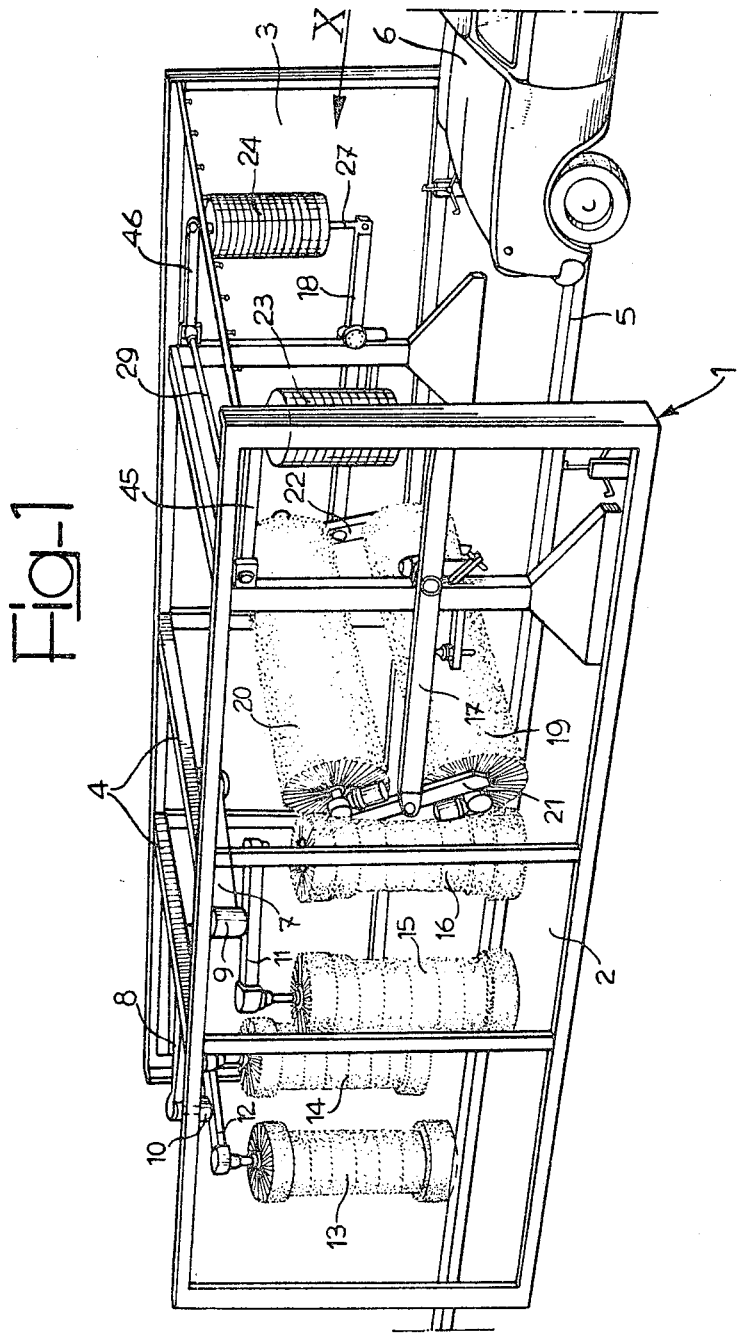
FIG. 1 is a perspective view of a plant for washing vehicles according to the invention.
Figure 2:
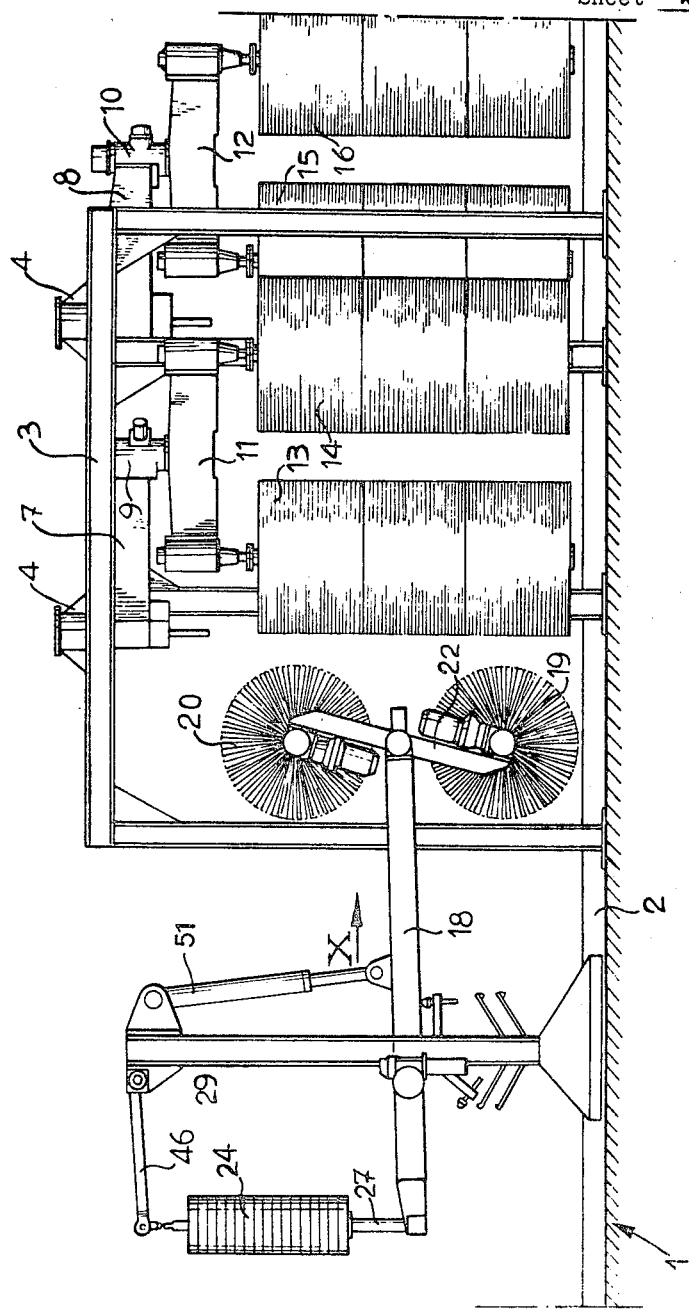
FIGS. 2 and 3 are a side elevational and a plan view, respectively, of the plant of FIG. 1.
Figure 3:
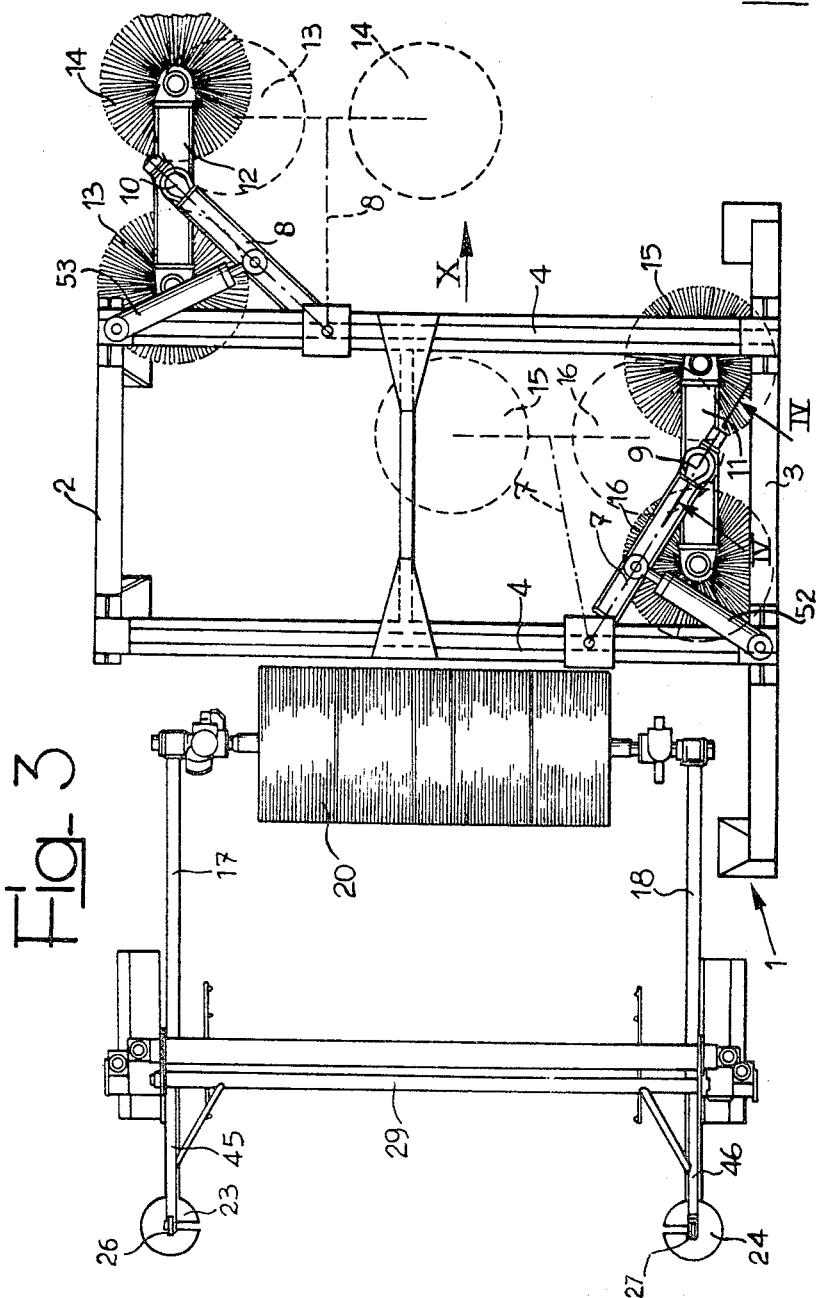

In FIGS. 1, 2 and 3 there is shown a stationary frame 1 of a washing plant according to the invention, the frame comprising two side walls 2, 3 interconnected at their tops by girders 4. A conveyor arrangement 5 is arranged on the floor of the plant site between the two side walls 2 and 3 and by suitably engaging a motor vehicle 6, moves the latter forward between the two side walls 2 and 3 in the direction of the arrows X.

Two arms 7, 8 are pivoted each to a girder 4 and are freely swingable in a horizontal plane. The end of each arm 7, 8 carries a pivot 9, 10, respectively, having a vertical axis, about which axes horizontal beams 11, 12, respectively, are pivoted each said beam at its centre. Two pairs of rotary brushes 15, 16 and 13, 14 of cylindrical shape are respectively suspended therefrom, one such brush at each end of each beam 11, 12, the suspended brush axes being vertical. The brush pairs 13, 14 and 15, 16 are situated close to the opposite side walls 2, 3, respectively, of the frame thereby to engage both sides of the vehicle 6.

With respect to the direction of movement X, the girder 4 with the arm 8 pivoted thereto, is arranged ahead of the girder 4 to which the arm 7 is pivoted, so that the brush pair 13, 14 is situated ahead of the brush pair 15, 16.

The side walls 2, 3 of the frame 1 each carry respectively one of two parallel levers 17, 18, each lever being centrally pivoted to the frame about a horizontal axis common to both the levers. A pair of brushes, 19, 20, each of which is rotatable about a separate horizontal axis, are supported in parallel arrangement by the ends of two beams 21, 22, which latter are also substantially parallel and are mounted for oscillation on the forward ends of the levers 17, 18, respectively, such oscillation being about a common horizontal axis. The other or rear end of each lever 17, 18 is arranged indirectly to carry a weight 23, 24 respectively, so that a substantial part of the weight of the brushes 19, 20 is balanced.

These counterweights 23, 24 are, as shown, carried by vertical rods 26 and 27, respectively, the ends of which rods are pivotally connected to the free ends of the levers 17, 18 respectively, and to cranks 45, 46, respectively. The said cranks are pivotally supported each by an upper part of a side wall 2, 3, respectively. The two cranks 45, 46 are interconnected by means of a coupling bar 29, which bar ensures that the levers 17 and 18 are always kept parallel to each other. In this way the oscillational axis common to the beams 21, 22 is kept substantially horizontal.

The horizontal brushes 19, 20 can be positioned behind the vertical brush pairs 13, 14 and 15, 16.

The arms 7, 8 are yieldably biased, for instance by an arrangement of pneumatic cylinders of conventional type 52 and 53, towards the middle regions of the frame 1 at which regions their movement is limited by stops. Their limited position is that shown in broken lines in FIG. 3.

Further resilient means are provided between the beams 11, 12, and their respective arms 7, 8 which means tend to hold the beams into a position transverse of the aforementioned direction X, that is to say, with the arms in the position shown by the broken lines in FIG. 3.

Figure 4:
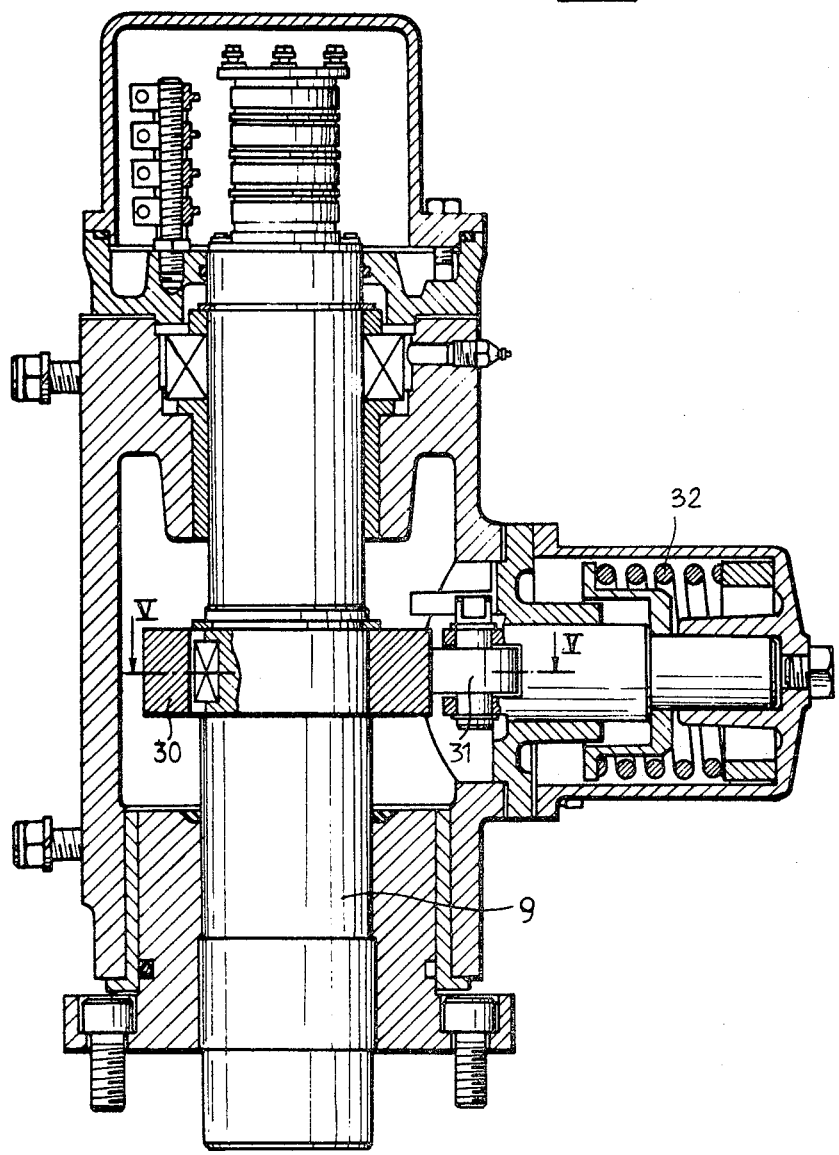
FIG. 4 is a sectional view taken along line IV—IV of FIG. 3.

As shown in FIGS. 4 and 5, with exemplary reference only to arm 7, the further resilient means each comprise, in association with an arm 7, 8 respectively, a cam 30 keyed to the pivot 9, 10 and a roller 31 carried by the arm 7, 8, each of which rollers is slidably mounted in a direction transversely of the respective pivot 9, 10. In each case the roller 31 is biased by a spring 32 towards the cam 30. The cam 30 has a profile so lobed that in the absence of external stresses the roller 31 settles in one of the recesses between the lobes thereby positioning the beams with respect to the arms in the required manner.

A still further resilient means of the cam and roller type as described above is also interposed between each of the beams 21, 22 and its respective lever 17, 18, these said means tending to maintain the said beams in a substantially vertical position when the brushes 19, 20 are in the lowered and rest position.

As shown in FIG. 6, when a vehicle 6 is moved forward in the direction X between the side walls 2 and 3 of the plant, the vehicle front is first engaged by the lower horizontal brush 19. On further forward movement of the vehicle 6, the action of the resilient means maintaining the beams 21, 22 in a vertical position is overcome and the said beams tilt about their horizontal axis, whereby the other and upper horizontal brush 20 engages the vehicle bonnet top. Still further forward movement of the vehicle 6 causes the levers 17, 18 to tilt and the brushes 19, 20 to rise upwards together and follow the contours of the vehicle roof.

When the leading brush 20 has reached and passed the vehicle rear limits, the beams 21, 22 return to their vertical positions and the brush 20 returns to a rest position wherein it lies beneath the brush 19.

A next vehicle to be washed is similarly engaged at its front end, but is of course engaged first by the brush 20, further movement of this next vehicle causing the beams to tilt as before but with the brush 19 leading.

After engagement of a vehicle with the horizontal brushes, the vertical brushes come into operation. As best seen from FIGS. 3 and 7, the vertical brush 15 lies, in its rest position, to the inside of the plant frame with respect to the brush 16 and so intercepts the front end of the vehicle 6 and is laterally displaced thereby following the forward movement of the latter. Further forward movement of the vehicle causes the beam 11 to rotate so that the other brush 16 engages the vehicle flank. The brush 14, which, in its rest position, is situated to the inside of the plant frame with respect to the brush 13, now engages the front end of the vehicle, and the beam 12 is rotated in the same manner as the beam 11, so that the brush 13 is urged towards and against the opposite side of the vehicle to that engaged by the brushes 15, 16. Still further forward movement of the vehicle causes the arms 7, 8 to spread apart, carrying with them the brushes 13, 14 and 15, 16, this separation following the contours of the vehicle sides. Finally, as the brushes 16, 13 are passed by the vehicle tail end, the arms 7, 8 close together again, and the beams 11, 12 are restored to their transverse rest position, the brushes 15, 14 being thus moved together over the vehicle rear end for cleaning it. As will be evident, when the latter brushes pass behind the vehicle rear end, the arms 7, 8 are free to close onto their stops and the beams adopt their transverse positions, now locating the brushes 13, 16 to the inside of the brushes 14, 15 respectively. Thus, a next vehicle to be washed will engage first the brushes 16, 13 of the pairs 15, 16 and 13, 14.

Lifting means for example, a pneumatic cylinder 51, are advantageously interposed between the levers 17, 18 which carry the beams 21, 22 and the frame 1, these means being operable from the outside of the frame for quickly lifting the brushes 19, 20 in an emergency or as necessary, for instance to avoid damaging a radio aerial which has inadvertently not been retracted before washing.

Various modifications of the invention are of course possible within the scope of the appended claims.

For instance, in the modified embodiment shown in FIGS. 8, 9 and 10 a frame 33 of the plant is of portal shape and is arranged to be movable in the direction Y which is perpendicular to the plane of the portal. A top girder 34 of the frame 33 is provided with rails 35 which guide a carriage 36, a horizontal beam 37 being pivoted directly (as shown) or indirectly to this carriage and carrying at its ends two rotary brushes 38, 39 of cylindrical shape and each having a vertical axis. The carriage 36 is provided with resilient means which act upon the beam 37 and tend to maintain the latter in a position transverse with respect to the direction Y.

As shown, the portal frame 33 carries a pair of levers 40, 41, which are centrally pivoted about a common horizontal axis and which support a rotary brush 42 with a horizontal axis. The levers 40, 41 are so arranged as to balance a substantial part weight of the brush 42.

During washing, the vehicle 6 remains stationary and the frame 33 is moved forwards in the direction Y. The carriage 36 is initially displaced to one end of the girder 34 and the front end of the vehicle 6 is first engaged by the brush 38, which engagement tilts the beam so that the brush 39 is urged against the side wall of the vehicle. Thus, both the brushes 38, 39 act on one side of the vehicle. When the brush 39 reaches the vehicle tail end, the beam 37 is again tilted in a transverse position with respect to the direction Y. The carriage 35 is now displaced, for instance by means of a rope control arrangement 43, to the other end of the girder 34 and on reaching this end the movement of the portal frame 33 is reversed. In this way the brushes 38, 39 are able now to act on the opposite side wall of the vehicle.

When the brushes reach the vehicle front portion, the beam 37 is again transversely displaced and the brushes 38, 39 are in position for return to their rest position by suitable transverse movement of the carriage 36.

As will be evident from the figures, the brush 42 engages the top of the vehicle and follows the contours thereof in the usual manner.

What we claim is:

1. A washing plant for vehicles in which the vehicle and plant move relative to each other in a direction longitudinal of the vehicle, the plant comprising; a frame including a brush beam supporting member, a revolving brush beam centrally pivoted from the supporting member, at least one pair of rotary brushes mounted adjacent each end of the revolving beam on opposite sides of the pivot so as to move orbitally about the pivotal axis of the revolving beam, and biasing means acting on the pivot of the revolving beam urging the beam and the brushes to a predetermined vehicle contacting position.

2. A washing plant as in claim 1 wherein the axis of the pair of rotary brushes are vertical, and the biasing means urge the beam to a position transverse to the direction of relative movement between the vehicle and plant.

3. A washing plant as in claim 2 further comprising an additional pair of rotary brushes with horizontal axes rotatably supported on opposite ends of a second centrally pivoted beam, and a counter balanced lever pivotally mounting the second beam.

4. A washing plant for vehicles as in claim 3 in which the beam supporting member is an overhead arm pivotally mounted to the frame to swing in a horizontal plane.

5. A washing plant as in claim 2 in which the beam supporting member is a carriage movable transversely to the direction of relative movement of the vehicle and plant on a track carried by the frame.

References Cited

UNITED STATES PATENTS 3,090,981   5/1963   Vani et al.

EDWARD L. ROBERTS, *Primary Examiner.*